United States Patent [19]

Carsten et al.

[11] 4,456,985
[45] Jun. 26, 1984

[54] APPARATUS FOR COUPLING SIGNALS TO OR FROM A TWO-WIRE LINE

[75] Inventors: Ralph T. Carsten, Nepean; Michael S. Nakhla, Ottawa; Charles B. D. Bunner, Carp, all of Canada

[73] Assignee: Northern Telecom Limited, Montreal, Canada

[21] Appl. No.: 333,664

[22] Filed: Dec. 23, 1981

[51] Int. Cl.³ .............................................. H04B 1/50
[52] U.S. Cl. ..................................... 370/30; 370/123; 179/2 DP; 333/131
[58] Field of Search .................. 179/2 C, 20 P, 170 D; 333/119, 131, 100, 4, 5; 370/69.1, 123, 30, 76

[56] References Cited

U.S. PATENT DOCUMENTS 4,368,361 1/1983 Chung et al. .................. 179/170 D
4,378,470 3/1983 Murto et al. .................... 179/2 C Primary Examiner—Douglas W. Olms
Assistant Examiner—Kenneth I. Rokoff
Attorney, Agent, or Firm—R. John Haley

[57] ABSTRACT

Voice-band signals are coupled to and from a telephone subscriber line via a low-pass filter which has a shunt capacitor coupled across the line. In order to simultaneously couple above voice-band signals to and from the line, this capacitor is coupled to the line via windings of a transformer. The above voice-band signals are coupled via at least one series inductor and the transformer to the line, the inductor being series resonant with the filter capacitor, as reflected through the transformer, at the above voice-band signal frequency. Two such series inductors provide for efficient coupling of signals to and from the line at two different frequencies, facilitating simultaneous transmission and reception of above voice-band signals, for example FSK data signals, via the line. Parallel resonant circuits are also provided to prevent degradation of the filter characteristics in the voice-band and to prevent coupling of receive frequency components from the transmit signal to the receive signal line.

17 Claims, 6 Drawing Figures

APPARATUS FOR COUPLING SIGNALS TO OR FROM A TWO-WIRE LINE

This invention relates to apparatus for coupling signals to or from a two-wire line. The invention is particularly, but not exclusively, concerned with apparatus for separately coupling both voice-band signals and above voice-band frequency-shift-keyed (FSK) data signals in both directions to and from a balanced two-wire line such as a telephone subscriber line.

Reference is directed to our U.S. Patent application Ser. No. 333,666 filed simultaneously herewith entitled "Apparatus for Coupling Signals to or from a Two-Wire Line", the entire disclosure of which is hereby incorporated herein by reference.

Reference is also directed to U.S. Patent application Ser. No. 333,665 filed simultaneously herewith by M. S. Nakhla entitled "Filters Comprising Reactive Components and a Method of Determining Impedances Thereof", the entire disclosure of which is hereby incorporated herein by reference.

the above-mentioned application by M. S. Nakhla describes a filtering arrangement which can satisfy particular design characteristics when terminated with various impedances. The filtering arrangement is exemplified by a low pass filter for coupling voice-band signals to and from arbitrary telephone subscriber lines of widely variable and complex impedance without resorting to buffering or adaptive arrangements. Such a filter is particularly useful for coupling voice-band signals on such lines to telephone equipment, without also coupling to such equipment above voice-band data signals which can be carried on the lines.

The above voice-band signals, for example FSK data signals, must also be coupled to and from the two-wire line. To this end, a coupling network is desired which does not adversely affect the designed filter characteristics, couples the data signals to and from the two-wire line in a balanced manner, and avoids the data signals being attenuated by the filter components. In the latter respect in particular the above filter includes a shunt capacitor which is coupled across the two-wire line and therefore provides a low impedance across the line for above voice-band data signals.

Accordingly, an object of this invention is to provide apparatus which facilitates coupling signals in a predetermined pass band of a filter, and signals having frequencies outside said pass band, to or from a two-wire line.

According to this invention there is provided apparatus comprising: a transformer having at least one first winding and at least one second winding; a filter having a predetermined pass band for coupling signals in the pass band to or from a two-wire line, the filter including a shunt capacitor coupled in series with the at least one second winding across the two-wire line; and an inductor coupled in series with the at least one first winding and forming with the capacitor, as reflected through the transformer, a series resonant circuit having a predetermined resonance frequency outside the pass band, whereby signals substantially at the predetermined resonance frequency are coupled to or from the two-wire line via the inductor and the transformer.

In preferred embodiments, the transformer comprises two second windings connected in series with the capacitor, one on each side thereof, across the two-wire line.

The apparatus preferably includes a parallel resonant circuit, resonant at substantially the predetermined resonance frequency and having a relatively low impedance in the pass band of the filter, coupled across the at least one first winding of the transformer. The parallel resonant circuit causes the second windings of the transformer to appear as virtual short circuits to signals in the pass band of the filter, so that the filter characteristics in the pass band are not degraded by the presence of the transformer and components coupled to it.

Apparatus may include a second inductor coupled in series with at least one first winding and forming with the capacitor, as reflected through the transformer, a second series resonant circuit having a second predetermined resonance frequency outside the pass band, whereby signals substantially at the second predetermined resonance frequency are coupled to or from the two-wire line via the second inductor and the transformer.

Alternatively, or in addition, the apparatus may include a capacitor coupled in parallel with the inductor to form a parallel resonant circuit having a second predetermined resonance frequency outside the pass band, whereby signals substantially at the second predetermined resonance frequency are not coupled via the inductor.

In particular, the filter may be a low pass filter and the two-wire line may comprise a telephone subscriber line.

The invention also provides apparatus for coupling signals substantially at a first frequency to a two-wire telephone subscriber line coupled to a low-pass filter for coupling voice-band signals to and from the line, the first frequency being in a stop band of the filter, and the filter including a shunt capacitor for connection across the line, the apparatus comprising: a transformer having a first winding and having two second windings connected in series with the capacitor, one on each side thereof, across the line; an inductor coupled in series with the first winding and forming with the capacitor, as reflected through the transformer, a series resonant circuit resonant at the first frequency; means for applying signals, to be coupled to the line and substantially at the first frequency, to the first winding via the inductor; and a parallel resonant circuit, resonant at substantially the first frequency and having a relatively low impedance to voice-band signals, coupled across the first winding.

The apparatus preferably also includes means for deriving signals substantially at a second frequency in the stop band of the filter from the line via the transformer. The said means conveniently comprises a second inductor coupled in series with the first winding and forming with the capacitor, as reflected through the transformer, a series resonant circuit resonant at the second frequency, the signals substantially at the second frequency being derived from the line via the transformer and the second inductor.

The apparatus may also include a capacitor coupled in parallel with the first-mentioned inductor to form a parallel resonant circuit resonant substantially at the second frequency.

Thus the apparatus can conveniently be used for coupling, for example, FSK data signals (or other narrow band carrier type signals) to and from the line, such signals being carried on the line simultaneously with voice-band signals.

The invention will be further understood from the following description with reference to the accompanying drawings, in which.

Figure 1:
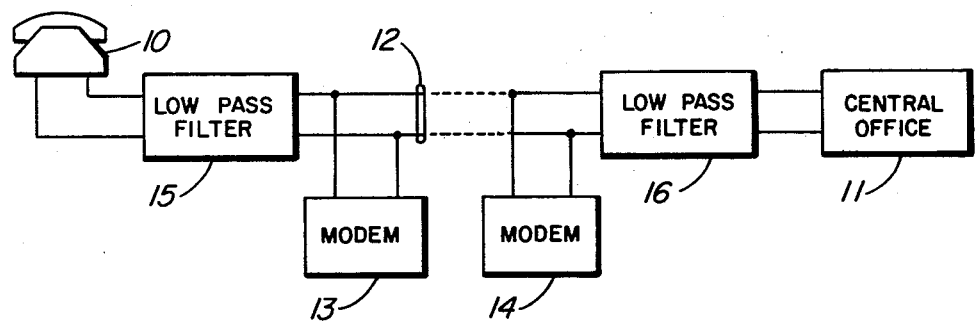
FIG. 1 illustrates in a block diagram a telephone subscriber line including at each end of the line a low pass filter for separating voice frequency signals from higher frequency data signals on the line.

Referring to FIG. 1, a subscriber's telephone 10 is coupled to a telephone central office 11 via a conventional two-wire subscriber line 12. Modems 13 and 14 are also connected, via coupling networks which are not shown in FIG. 1, to the subscriber line 12 for transmitting data via the subscriber line between the locations of the telephone 10 and the central office 11 at above voice-band frequencies. In order to prevent the data from passing to the telephone 10 and to the central office 11, these are coupled to the subscriber line 12 via low pass filters 15 and 16.

Figure 2:
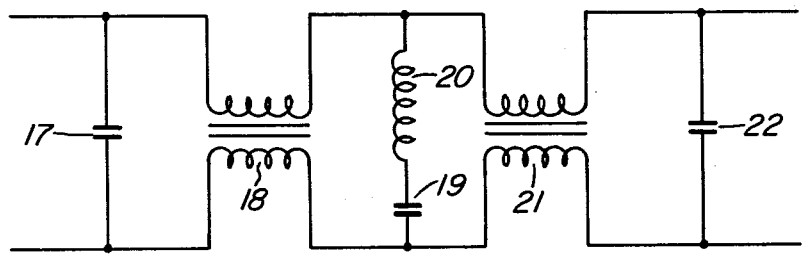
FIG. 2 illustrates a balanced form of each low pass filter.

As described in the application by M. S. Nakhla already referred to, each low pass filter 15, 16 is preferably a 5th order filter as shown in FIG. 2, comprising a shunt capacitor 17, a series inductor 18 which is divided equally between the two wires of the filter and is constituted by two coupled coils to provided small size and good longitudinal balance, a shunt capacitor 19 in series with an inductor 20, a series inductor 21 similar to the inductor 18, and a shunt capacitor 22. For the filter to have a characteristic including a pass band up to a frequency of 3200 Hz in which the filter has a maximum attenuation ripple of ±0.1 dB relative to the attenuation at 1000 Hz, and a stop band above a frequency of 21 kHz in which the filter has a minimum attenuation of 60 dB, the components 17 to 22 have values of 30.88 nF, 24.96 mH, 80.54 nF, 0.399 mH, 24.96 mH, and 30.88 nF respectively. Each series inductor 18 and 21 is conveniently formed by two bifilar wound coils coupled as indicated in FIG. 2, the inductance of each individual coil, measured with the coil to which it is coupled open-circuit, being 6.24 mH.

Shown in FIG. 2 the shunt capacitor, for example 22, at the line 12 side of the low pass filter provides a low impedance across the line 12 for above voice-band signals. Consequently a problem arises in transmitting such signals between the modems 13 and 14 via the line 12 without excessive attenuation or loss of the signals due to the shunt capacitors of the filters. Furthermore, it is necessary to couple the modems 13 and 14 to the line 12 in such a manner that the design characteristics of the filters 15 and 16 are still complied with. This presents a significant problem in particular in maintaining the desired small attenuation ripple in the filter pass band.

Furthermore, it is desirable to provide for full duplex transmission of signals between the modems 13 and 14, simultaneously with the transmission of voice signals on the line 12. For example, the signals transmitted from the modem 13 to the modem 14 may be FSK data signals at a center frequency of 36 kHz and having actual frequencies of 35.5 and 36.5 kHz, and the signals transmitted from the modem 14 to the modem 13 may be FSK data signals at a center frequency of 22 kHz and having actual frequencies of 21.5 and 22.5 kHz. These signal frequencies are assumed to be used in the following description, but other frequencies and types of signal transmission may be used.

Figure 3:
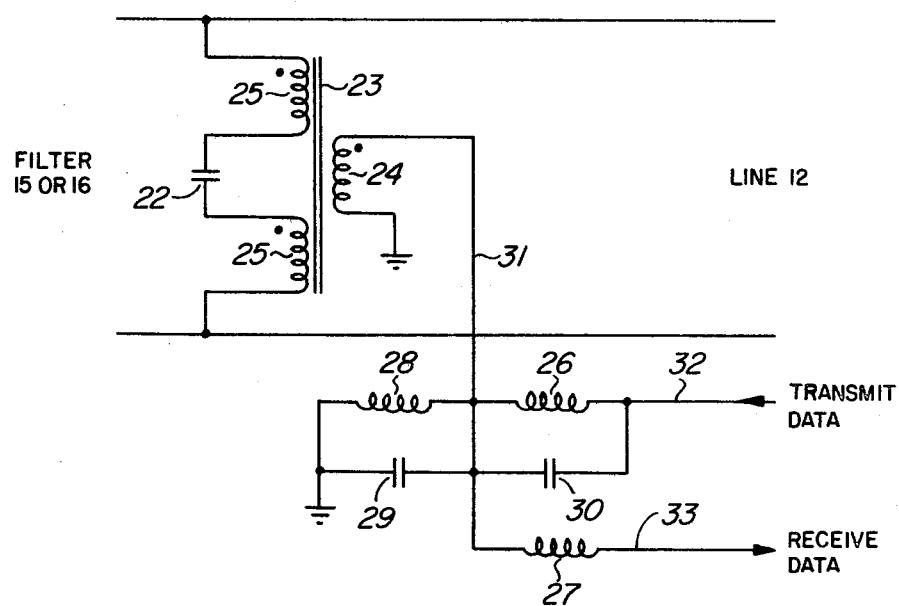
FIG. 3 shows apparatus illustrating the principles of embodiments of the invention.

In addition, the line 12 is generally a balanced line, and it is therefore generally desired to couple the data signals between the line and the modems in a balanced manner. FIG. 3 shows apparatus which illustrates how in accordance with embodiments of the invention the various desiderata above can be met.

FIG. 3 shows only the shunt capacitor 22 of the filter 15 or 16 at the line 12 side of the respective filter, the remainder of the filter being as illustrated in FIG. 2. In addition, FIG. 3 shows a data coupling network comprising a transformer 23 having a first winding 24 and two second windings 25 phased as shown by dots, inductors 26, 27, and 28, and capacitors 29 and 30. The second windings 25 of the transformer 23 are coupled in series with the filter capacitor 22, one on each side thereof, across the line 12, to provide a balanced coupling of data signals to and from the line 12. The first winding 24 of the transformer is connected between a wire 31 and circuit ground. With the wire 31 connected as described below, the transformer has a relatively small inductive reactance in the voice-band compared with the capacitive reactance of the capacitor 22, but the actual magnitude of this reactance is not critical because the low pass filter is designed to be insensitive to its terminations. The inductance of the transformer 23, measured across the first winding 24 with the capacitor 22 shorted and the second windings 25 open circuit, is relatively large (for example 8 to 10 times the inductance of the inductor 26) to avoid affecting the resonance described below of the inductor 26 with the capacitor 22.

Transmit data at the respective transmit frequency and present on a wire 32 is coupled to the wire 31 via the inductor 26. The inductance of the inductor 26 is selected so that it is series resonant with the filter capacitor 22, as reflected through the transformer 23, at the transmit frequency. Thus the effect on the transmit data of the shunt capacitor 22 of the low pass filter is compensated by the inductor 26. Similarly the inductance of the inductor 27, which couples receive data from the wire 31 to a wire 33, is selected so that this inductor 27 is series resonant with the filter capacitor 22, as reflected through the transformer 23, at the respective receive frequency. Thus the effect on the receive data of the shunt capacitor 22 is compensated by the inductor 27. The series inductors 26 and 27 therefore facilitate efficient coupling of transmit and receive data between the wires 32 and 33 and the line 12.

In order to inhibit any component at the receive frequency in the transmit data from reaching the line 31, the capacitor 30 is connected in parallel with the inductor 26 to form therewith a parallel resonant circuit which is resonant at the receive frequency.

The inductor 28 and the capacitor 29 are also connected in parallel to form a parallel resonant circuit which is connected between the wire 31 and circuit ground. The values of the components 28 and 29 are selected so that this circuit is resonant at the respective transmit frequency, so that this resonant circuit presents an open circuit to, and does not attenuate, the transmit data on the line 31. At voice frequencies this resonant circuit has a low impedance so that it is a virtual short circuit across the first winding 24 of the transformer 23. Consequently in the filter pass band the second windings 25 of the transformer are virtual short circuits, so that the capacitor 22 is effectively connected directly across the line 12 as in FIG. 2 and the pass band characteristics of the low pass filter are not degraded. In addition, the parallel resonant circuit reduces the effects of impulse noise, for example due to dial pulsing, on circuits connected to the wires 32 and 33, because of its virtual short circuit at voice frequencies where most of the energy of such noise is concentrated.

The parallel resonant circuit comprising the components 28 and 29 provides some attenuation of receive data at the receive frequency, but this is readily compensated for by amplification of the receive data signals. This attenuation can be avoided by providing in place of the components 28 and 29 a more complicated circuit which is parallel resonant at both the receive and transmit frequencies, and has a low impedance in the voiceband.

Figure 4:
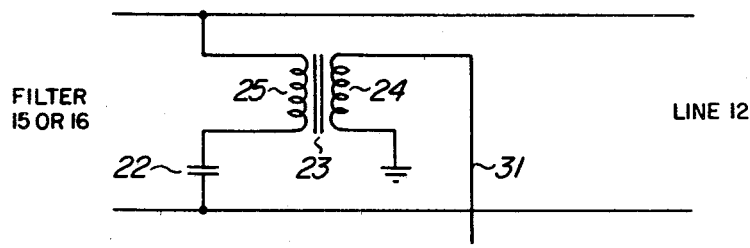
FIG. 4 illustrates an alternative transformer coupling arrangement to that shown in FIG. 3, the alternative arrangement being suitable for coupling signals to and from an unbalanced two-wire line.

FIG. 4 illustrates a alternative arrangement to that of FIG. 3, showing only the filter capacitor 22 and the transformer 23 and their connections, which can be used to couple data signals to and from an unbalanced line 12. The remainder of the coupling network in this case can be as illustrated in FIG. 3. In FIG. 4, the transformer 23 simply has, in addition to the first winding 24 connected between the wire 31 and circuit ground, a single second winding 25 connected in series with the capacitor 22 across the line 12. This arrangement could also be used, if desired, for coupling data signals to and from a balanced line 12, but the arrangement of FIG. 3 is preferred.

Figure 5:
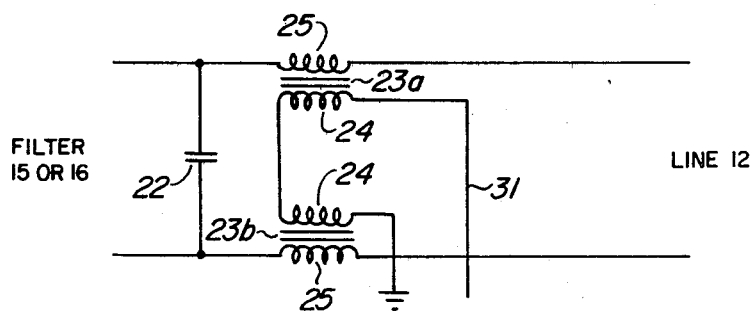
FIG. 5 illustrates another alternative transformer coupling arrangement, for coupling signals to and from a balanced two-wire line.

FIG. 5 illustrates another alternative arrangement to that of FIG. 3, again showing only the filter capacitor 22 and the transformer 23 and their connections, which can be used to couple data signals to and from a balanced line 12. Again, the remainder of the coupling network can be as illustrated in FIG. 3. In FIG. 5, the transformer 23 is divided into two parts 23a and 23b, each of which has a first winding 24 and a second winding 25. The first windings 24 are connected in series between the wire 31 and circuit ground. The second windings 25 are connected each in series with a respective wire of the line 12, whereby the filter capacitor 22 is again connected across the line 12 via these windings 25. With appropriately phased second windings connected as shown in FIG. 5, the two parts 23a and 23b of the transformer 23 could be combined into a single transformer 23 having a single first winding as shown in FIG. 3.

The transformer arrangement shown in FIG. 3 is preferred over that of FIG. 5, because the latter arrangement contributes additional d.c. resistance to the subscriber loop including the line 12. However, the arrangement of FIG. 5 can be used if the additional d.c. resistance in the subscriber loop provided by the second windings 25 is acceptable.

Figure 6:
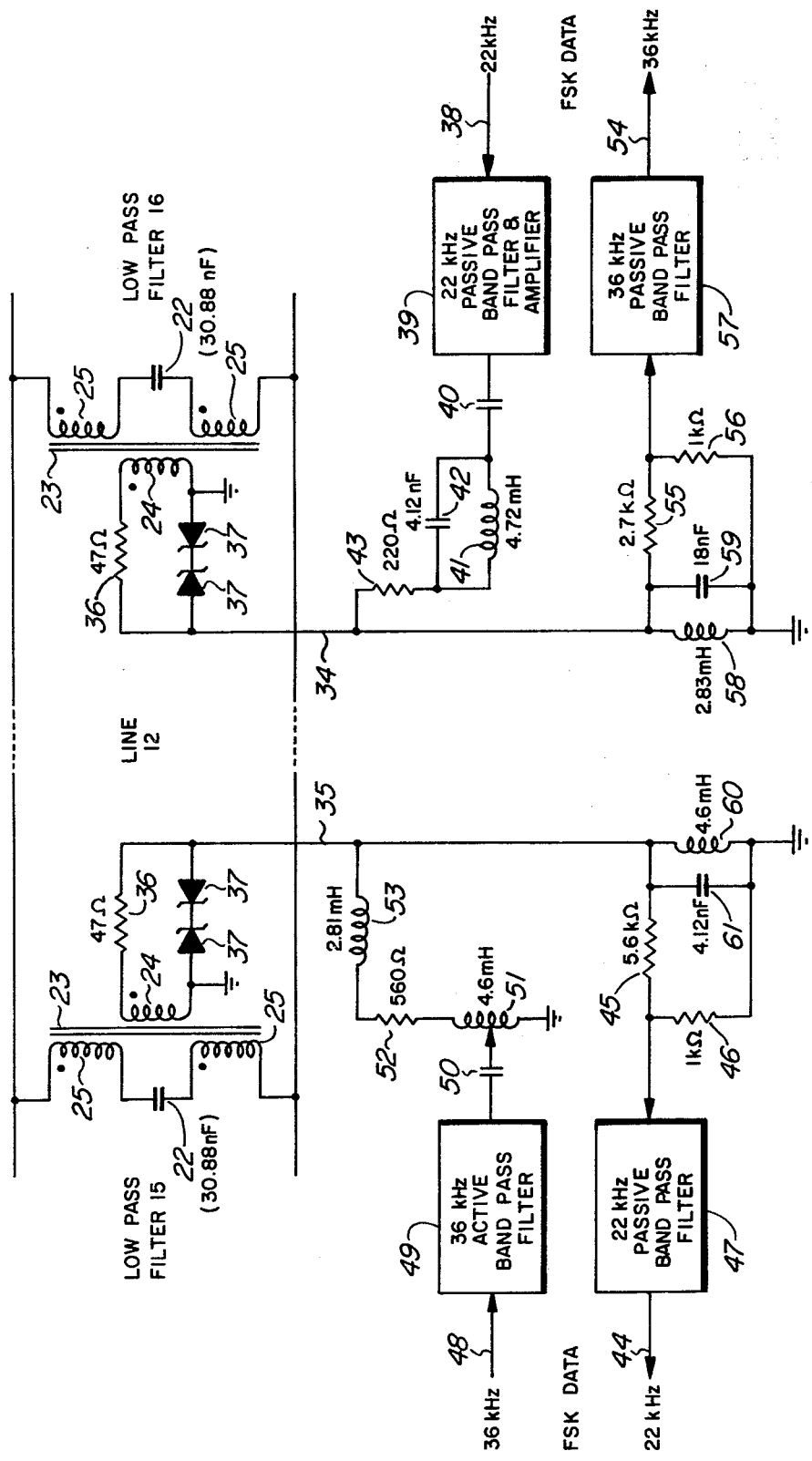
FIG. 6 illustrates in detail apparatus for coupling full duplex FSK data signals at the ends of a balanced telephone subscriber line, in accordance with an embodiment of the invention.

FIG. 6 shows in detail apparatus for coupling FSK data signals at the frequencies mentioned above, to and from a balanced line 12 for full duplex transmission thereon between the low pass filters 15 and 16. Component values shown in FIG. 6 are for these frequencies.

Wires 34 at the central office end and 35 at the subscriber end of the line, each corresponding to the wire 31 in FIG. 3, are coupled to the line 12 via respective identical transformers 23 which are connected in the manner described with reference to FIG. 3. The first winding 24 of each transformer 23 has 164 turns, and the second windings 25 of each transformer 23 together have a total of 78 turns, providing a turns ratio from the first winding to the second windings of 2.1:1. Each of the wires 34 and 35 is connected to the respective winding 24 via a respective resistor 36 and is also connected to circuit ground via respective series-connected oppositely-poled zener diodes 37 to provide secondary protection, against transients due to lightning and other causes, for the circuitry coupled to the wires 34 and 35. Primary protection is provided separately in known manner, for example by surge protectors connected directly across the line 12.

Transmit FSK data signals at the center frequency of 22 kHz are coupled from a wire 38 to the wire 34, and thence to the line 12 at the central office end thereof, via a 22 kHz passive band pass filter and amplifier 39, a coupling capacitor 40, a parallel resonant circuit comprising an inductor 41 and a capacitor 42 resonant at the receive frequency of 36 kHz, and a series resistor 43 which reduces impulse noise effects on the output of the filter and amplifier 39. The inductor 41 is series resonant with the capacitor 22 of the filter 16, as reflected through the transformer 23, at the transmit frequency of 22 1 kHz. At the subscriber end of the line 12 these data signals are coupled from the line 12 to the wire 35, and thence to a wire 44 via a series resistor 45, a shunt resistor 46, and a 22 kHz passive band pass filter 47. The resistors 45 and 46 serve to properly terminate the filter 47 and avoid unduly loading the wire 34.

In the opposite transmission direction, transmit FSK data signals at the center frequency of 36 kHz are coupled from a wire 48 to the wire 35, and thence to the line 12 at the subscriber end thereof, via a 36 kHz active band pass filter 49, a coupling capacitor 50, a step-up transformer 51, a series resistor 52, and a series inductor 53. The inductor 53 is series resonant with the capacitor 22 of the filter 15, as reflected through the transformer 23, at the transmit frequency of 36 kHz. The series resistor 52 reduces the effects of impulse noise on the active filter 49, which provides suppression of 22 kHz components in the transmit data so that in this case no capacitor is provided in parallel with the inductor 53 to resonate at this frequency. At the central office end of the line 12, the 36 kHz data signals are coupled from the line 12 to the wire 34, and thence to a wire 54, via a series resistor 55, a shunt resistor 56, and a 36 kHz passive band pass filter 57. The resistors 55 and 56 serve to properly terminate the filter 57 and avoid unduly loading the line 12.

The wire 34 is also coupled to circuit ground via a parallel resonant circuit, comprising an inductor 58 and a capacitor 59, resonant at the transmit frequency of 22 kHz. Similarly the wire 35 is coupled to circuit ground via a parallel resonant circuit, comprising an inductor 60 and a capacitor 61, resonant at the subscriber end transmit frequency of 36 kHz. These resonant circuits provide the same functions as the circuit comprising the components 28 and 29 in FIG. 3. The attenuation of receive data signals by these circuits, and by the voltage dividers formed by the resistors 45, 46 and 55, 56, can be compensated for by amplification of the signals on the wires 44 and 54.

The apparatus of FIG. 6 does not include series inductors in the receive data paths, corresponding to the inductor 27 in FIG. 3. Such inductors may be provided, in series with the resistors 45 and 55 respectively and resonant with the respective capacitor 22 at the respective receive frequency, in order to improve the coupling of data from the line 12 to the filters 47 and 57. However, it has been found that such improved coupling of the receive data is not essential and accordingly that the cost of the series inductors in the receive data paths can be avoided. In this case the filters 47 and 57 must compensate for any reduced selectivity incurred by omitting these series inductors. The inductors 41 and 53 in the transmit data paths could be dispensed with instead, and the series inductors in the receive data paths provided, to achieve efficient coupling of only the receive data signals, but this is much less desirable in view of the greater dynamic range and power levels of the transmit data signals which would then be required, the relative ease with which the receive data signals can be amplified, and the use of the inductor 41 to form a parallel resonant circuit with the capacitor 42.

Although the invention has been described in its application to the coupling of signals to and from a telephone subscriber line and in conjunction with a low pass filter, the invention is not limited thereto and may be applied in conjunction with other types of transmission line and other filters including a terminal shunt capacitor. For example, the arrangements described above may obviously be simplified by providing only one of the series inductors 26 and 27 in FIG. 3, and not the other series inductor and not the capacitor 30, for one-way or semi-duplex transmission of signals at the relevant frequency via the line 12.

In addition, although the invention has been described above in relation to the coupling of FSK data signals at precisely defined frequencies to and from the line 12, the invention is not limited thereto. The series resonant circuits described may be provided within relatively low Q factors to facilitate coupling of data signals within a relatively wide band of frequencies. Furthermore, a plurality of separate series inductors 26 or 27, each series resonant with the filter capacitor 22 at a respective frequency outside the filter pass band, may be provided to facilitate coupling of data signals within an even wider band of frequencies.

Numerous other modifications, variations, and adaptations may be made to the particular embodiments of the invention described above without departing from the scope of the invention as defined in the claims.

What is claimed is:

1. Apparatus comprising:
    a transformer having at least one first winding and at least one second winding;
    a filter having a predetermined pass band for coupling signals in the pass band to or from a two-wire line, the filter including a shunt capacitor coupled in series with the at least one second winding across the two-wire line; and
    an inductor coupled in series with the at least one first winding and forming with the capacitor, as reflected through the transformer, a series resonant circuit having a predetermined resonance frequency outside the pass band, whereby signals substantially at the predetermined resonance frequency are coupled to or from the two-wire line via the inductor and the transformer.

2. Apparatus as claimed in claim 1 wherein the transformer comprises two second windings connected in series with the capacitor, one on each side thereof, across the two-wire line.

3. Apparatus as claimed in claim 1 and including a parallel resonant circuit, resonant at substantially the predetermined resonance frequency and having a relatively low impedance in the pass band of the filter, coupled across the at least one first winding of the transformer.

4. Apparatus as claimed in claim 2 and including a parallel resonant circuit, resonant at substantially the predetermined resonance frequency and having a relatively low impedance in the pass band of the filter, coupled across the at least one first winding of the transformer.

5. Apparatus as claimed in claim 1 or 2 and including a second inductor coupled in series with the at least one first winding and forming with the capacitor, as reflected through the transformer, a second series resonant circuit having a second predetermined resonance frequency outside the pass band, whereby signals substantially at the second predetermined resonance frequency are coupled to or from the two-wire line via the second inductor and the transformer.

6. Apparatus as claimed in claim 3 or 4 and including a second inductor coupled in series with the at least one first winding and forming with the capacitor, as reflected through the transformer, a second series resonant circuit having a second predetermined resonance frequency outside the pass band, whereby signals substantially at the second predetermined resonance frequency are coupled to or from the two-wire line via the second inductor and the transformer.

7. Apparatus as claimed in claim 1 or 2 and including a capacitor coupled in parallel with the inductor to form a parallel resonant circuit having a second predetermined resonance frequency outside the pass band, whereby signals substantially at the second predetermined resonance frequency are not coupled via the inductor.

8. Apparatus as claimed in claim 3 or 4 and including a capacitor coupled in parallel with the inductor to form a parallel resonant circuit having a second predetermined resonance frequency outside the pass band, whereby signals substantially at the second predetermined resonance frequency are not coupled via the inductor.

9. Apparatus as claimed in claim 1 or 2 and including a second inductor coupled in series with the at least one first winding and forming with the capacitor, as reflected through the transformer, a second series resonant circuit having a second predetermined resonance frequency outside the pass band, whereby signals substantially at the second predetermined resonance frequency are coupled to or from the two-wire line via the second inductor and the transformer, and further including a capacitor coupled in parallel with the first-mentioned inductor to form a parallel resonant circuit resonant substantially at the second predetermined resonance frequency, whereby signals substantially at the second predetermined resonance frequency are not coupled via the first-mentioned inductor.

10. Apparatus as claimed in claim 3 or 4 and including a second inductor coupled in series with the at least one first winding and forming with the capacitor, as reflected through the transformer, a second series resonant circuit having a second predetermined resonance frequency outside the pass band, whereby signals substantially at the second predetermined resonance frequency are coupled to or from the two-wire line via the second inductor and the transformer, and further including a capacitor coupled in parallel with the first-mentioned inductor to form a parallel resonant circuit substantially at the second predetermined resonance frequency, whereby signals substantially at the second predetermined resonance frequency are not coupled via the first-mentioned inductor.

11. Apparatus as claimed in claim 1 or 2 wherein the filter is a low-pass filter.

12. Apparatus as claimed in claim 3 or 4 wherein the filter is a low-pass filter.

13. Apparatus as claimed in claim 1 or 2 wherein the filter is a low-pass filter and the two-wire line comprises a telephone subscriber line.

14. Apparatus as claimed in claim 3 or 4 wherein the filter is a low-pass filter and the two-wire line comprises a telephone subscriber line.

15. Apparatus for coupling signals substantially at a first frequency to a two-wire telephone subscriber line coupled to a low-pass filter for coupling voice-band signals to and from the line, the first frequency being in a stop band of the filter, and the filter including a shunt capacitor for connection across the line, the apparatus comprising:

a transformer having a first winding and having two second winding connected in series with the capacitor, one on each side thereof, across the line;

an inductor coupled in series with the first winding and forming with the capacitor, as reflected through the transformer, a series resonant circuit resonant at the first frequency;

means for applying signals, to be coupled to the line and substantially at the first frequency, to the first winding via the inductor; and a parallel resonant circuit, resonant at substantially the first frequency and having a relatively low impedance to voice-band signals, coupled across the first winding.

16. Apparatus as claimed in claim 15 and including a second inductor coupled in series with the first winding and forming with the capacitor, as reflected through the transformer, a series resonant circuit resonant at a second frequency in the stop band of the filter, and means for deriving signals substantially at the second frequency from the line via the transformer and the second inductor.

17. Apparatus as claimed in claim 16 and including a capacitor coupled in parallel with the first-mentioned inductor to form a parallel resonant circuit resonant substantially at the second frequency.

* * * * *